(12) United States Patent
Kopparthi

(10) Patent No.: US 10,025,740 B2
(45) Date of Patent: Jul. 17, 2018

(54) SYSTEMS AND METHODS FOR OFFLOADING LINK AGGREGATION TO A HOST BUS ADAPTER (HBA) IN SINGLE ROOT I/O VIRTUALIZATION (SRIOV) MODE

(71) Applicant: CAVIUM, INC., San Jose, CA (US)

(72) Inventor: Ramarao Kopparthi, Hydearabad (IN)

(73) Assignee: Cavium, Inc., San Jose, CA (US)

( * ) Notice: Subject to any disclaimer, the term of this patent is extended or adjusted under 35 U.S.C. 154(b) by 129 days.

(21) Appl. No.: 15/265,252

(22) Filed: Sep. 14, 2016

(65) Prior Publication Data

US 2017/0075845 A1  Mar. 16, 2017

Related U.S. Application Data

(60) Provisional application No. 62/218,436, filed on Sep. 14, 2015.

(51) Int. Cl.
| G06F 13/36 | (2006.01) |
| G06F 13/40 | (2006.01) |
| G06F 9/455 | (2018.01) |

(52) U.S. Cl.
CPC ...... *G06F 13/4027* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| 8,065,454 B1 * | 11/2011 | Sonksen | G06F 13/385 710/10 |
| 9,047,208 B1 * | 6/2015 | Moore | G06F 9/45533 |
| 2012/0084487 A1 * | 4/2012 | Barde | G06F 9/45541 711/6 |
| 2013/0086583 A1 * | 4/2013 | Uemura | G06F 9/4401 718/1 |
| 2013/0247056 A1 * | 9/2013 | Hattori | G06F 9/5077 718/102 |
| 2014/0019969 A1 * | 1/2014 | Goggin | G06F 3/061 718/1 |
| 2016/0350151 A1 * | 12/2016 | Zou | G06F 9/45558 |

* cited by examiner

*Primary Examiner* — Elias Mamo

(57) ABSTRACT

A new approach is proposed to offload of link aggregation from a host to a HBA in SRIOV mode. The HBA first creates one or more link aggregation offload engines each having one or more physical ports and to establish a first link between a VM running on the host and one of the link aggregation offload engines for network data transmission with the VM. Once a data packet is received from the VM over the first link, the link aggregation offload engine chooses a first physical port based on its link aggregation method and establish a second link with the chosen first physical port to transmit the packet out of the HBA. If the second link fails, the link aggregation offload engine then chooses a second physical ports and establish a third link with the chosen second physical port to transmit the packet out of the HBA device instead.

22 Claims, 3 Drawing Sheets

SYSTEMS AND METHODS FOR OFFLOADING LINK AGGREGATION TO A HOST BUS ADAPTER (HBA) IN SINGLE ROOT I/O VIRTUALIZATION (SRIOV) MODE

CROSS-REFERENCE TO RELATED APPLICATIONS

This application claims the benefit of U.S. Provisional Patent Application No. 62/218,436, filed Sep. 14, 2015, and entitled "Link Aggregation for the Virtual Functions (VF) of a Host Bus Adapter (HBA) in Single Root I/O Virtualization (SRIOV) Mode and Method for Offloading Link Aggregation to HBA," which is incorporated herein in its entirety by reference.

BACKGROUND

A host bus adapter (HBA), such as a network interface card (NIC), provides input/output (I/O) processing and physical connectivity between a host or server with another storage and/or network device (e.g., a physical network switch). Single root input/output virtualization (SRIOV) is a network interface that allows a single PCIe device to appear to be multiple separate PCIe devices in a virtual environment by offering both a plurality of physical functions (PFs) and a plurality of virtual functions (VFs), wherein the PFs are full-featured PCIe functions and the virtual functions (VFs) are "lightweight" functions that allow different virtual components (e.g., virtual machines) on the host to share the single PCIe device. A HBA in SRIOV mode is configured to have multiple PFs and VFs to provide both physical and virtual connections, respectively, between a plurality of virtual machines (VMs) running on the host to a storage or network device.

Aggregation (also referred as bonding and teaming) of communication links between the VMs (or its applications) running on the host and the storage or network device is adopted to provide increased bandwidth beyond what a single link can provide and also to provide redundancy in case of link failures. Currently, link aggregation is done by creating a bonding interface in the host OS with two or more ports participating in the link aggregation, wherein the VMs running on the host can send or receive network traffic via the bonding interface. Under such setup, if link redundancy is required for a VM with VF assigned (PCIe pass-through), at least two VFs from different PFs of the HBA must be assigned to and be bonded in the VM, which reduces the number of VFs available and thus the number of VMs that can run on the host. Furthermore, the setup may provide higher bandwidth than required for the VM, which may increase the overall cost of the host. In addition, performing link aggregation in the host OS requires extra CPU cycles for link monitoring and driving the network traffic based on the bonding algorithm configured, thus putting extra burden on the computing and networking resources of the host. Finally, some of the HBA offload features may get disabled when link aggregation is enabled. In the non-limiting example of an NIC, bonding mode such as round-robin, large receive offload (LRO) and TCP segmentation offload (TSO) are disabled for the ports participating in the bonding when bonding for link aggregation is enabled, which results in reduced throughput of the NIC. As such, it is desirable to offload the link aggregation from the host.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
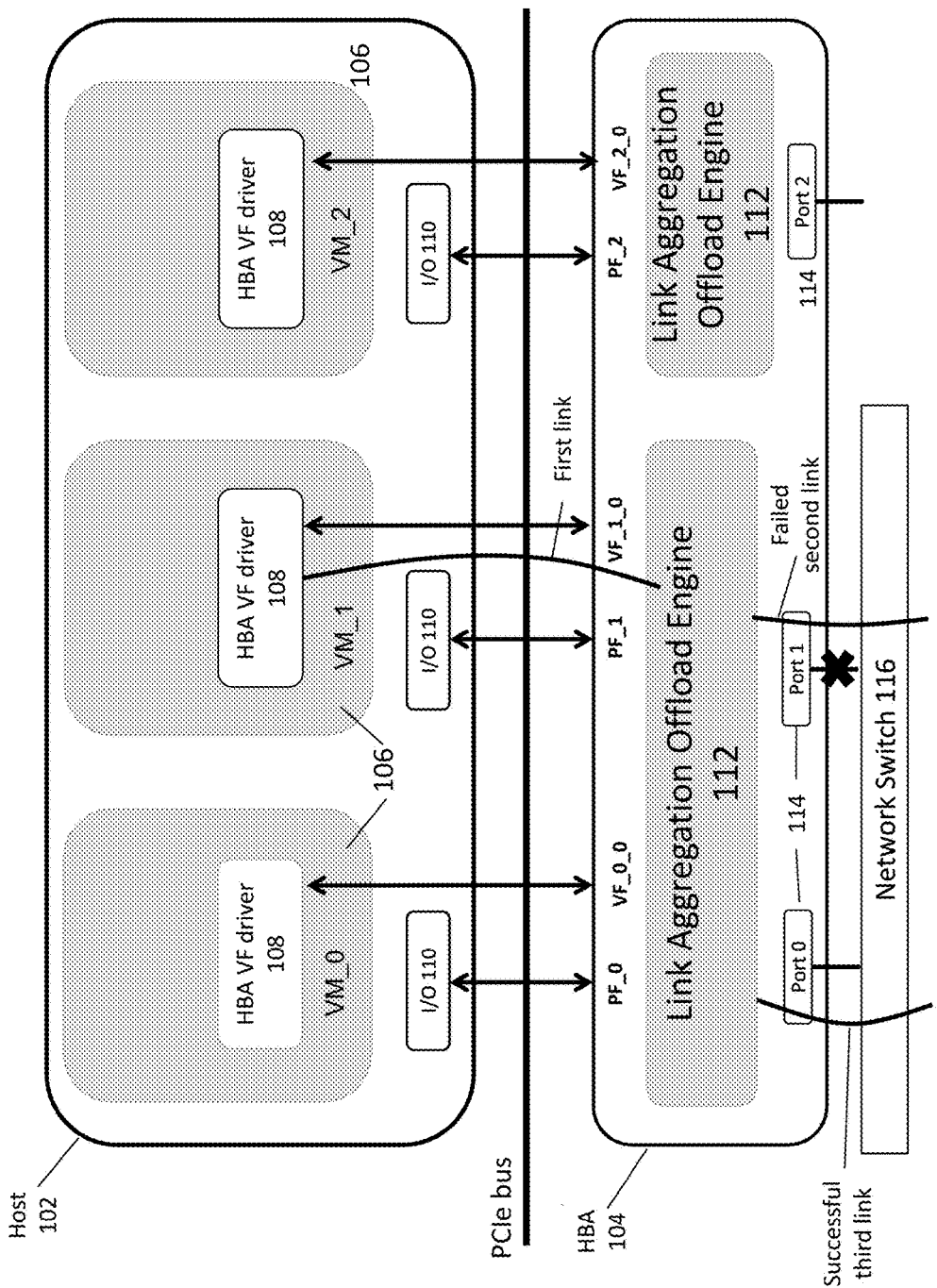
FIG. 1 depicts an example of a diagram of system to support offloading of link aggregation from a host to a HBA in SRIOV mode in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support offloading of link aggregation from a host to a HBA in SRIOV mode. Instead of allowing a VM (or an application on the VM) running on the host to establish a direct communication link with a storage or network device through the HBA, the HBA is configured to create one or more link aggregation offload engines each having one or more physical ports and to establish a first link between one of the link aggregation offload engines and the VM for network data transmission with the VM. Once a data packet is received from the VM over the first link, the link aggregation offload engine is configured to choose a first of its physical ports based on its link aggregation method and establish a second link with the chosen first physical port to transmit the packet to an external storage or network device. If the second link fails, the link aggregation offload engine is configured to choose a second of its physical ports and establish a third link with the chosen second physical port to transmit the packet to the storage or network device instead.

By offloading the link aggregation from the host to the HBA, the proposed approach requires only one link (the first link) between the VM and the HBA, which consumes only one VF of the HBA per VM at all times and thus frees up VFs of the HBA to serve other VMs running on the host. In addition, since link aggregation or bonding is offloaded from the host to the link offload engine of the HBA, the proposed approach alleviates consumption of computing resources (e.g., CPUs and memories) of the host, which can be utilized by the host for other purposes.

In some embodiments, the HBA is an NIC, which is designed to include an ASIC chip or a multi-core network packet processing engine to support flexible packet processing at various I/O rates (e.g., 10, 25, and 40 Gbps). In the case of NIC, since LRO and TSO are performed on the bonding interface of the NIC) and not on their physical ports, they are still supported under the proposed approach. Although NIC is used as a non-limiting example of the HBA in the following discussions, a person ordinarily skilled in the art would have understood that the same approach can also be applied to other types of HBAs, which can be but are not limited to, iSCSI adapters, fibre channel (FC) HBAs, or non-volatile memory express (NVMe) over Fabrics.

FIG. 1 depicts an example of a diagram of system 100 to support offloading of link aggregation from a host to a HBA in SRIOV mode. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a host 102 and a HBA 104. Here, the host 102 can be a computing device, a communication device, a storage device, or any electronic device capable of running one or more software components. For non-limiting examples, a computing device can be but is not limited to a laptop PC, a desktop PC, a tablet PC, or an x86, OCTEON, or ARM based device/system/server running Linux or other operating systems. The HBA 104 can be a multi-core embedded hardware module/process engine or a single System-on-Chip (SoC) chip comprising one or more of coprocessors (not shown), a memory (also referred to as primary memory, not shown) such as RAM, and a storage unit (not shown) such as a non-volatile memory (also referred to as secondary memory) with software instructions stored in for practicing one or more processes. Here, the host 102 and the HBA 104 are configured to communicate with each other over a communication interface (not shown) such as a high-speed Peripheral Component Interconnect Express (PCIe) bus coupled between the host 102 and the HBA 104. The PCIe bus is a high-speed serial computer expansion bus designed to support hardware I/O virtualization and to enable maximum system bus throughput, low I/O pin count and small physical footprint for bus devices.

In the example of FIG. 1, the host 102 is configured to run one or more guests/VMs 106, each of which is a software implementation of a physical machine that executes programs to emulate an existing computing environment such as an operating system (OS) to support one or more applications running on it. In some embodiments, each of the VMs 106 running on the host 102 has a HBA VF driver 108, which is a virtual function (VF) driver configured to set up a communication link/path between its corresponding VM 106 and one of the VFs (e.g., VF_0_0) provided by the HBA 104 and assigned/dedicated to the corresponding VM 106 for transmission of data packets via one of the I/O components 110 of the host 102. The I/O components 110 of the host 102 are physical network/Ethernet ports of the host 102 serving as input/output interfaces with the HBA 104. Each I/O component 110 invokes one of the PFs, e.g., PF_0, provided by the HBA 104, wherein the PFs are PCIe functions provided by the HBA 104 that support SRIOV interface and can be used to configure and manage the SRIOV functionality of the HBA 104 such as enabling virtualization and exposing PCIe VFs. In some embodiments, the HBA VF driver 108 is a lightweight PCIe function associated with the PFs on the HBA 104 that supports SRIOV mode and represents a virtualized instance of the HBA 104. Each VF shares one or more physical resources on the HBA 104, such as physical network ports 114, with the PFs and other VFs. Once the link is established, data packets are transmitted via the HBA 104 either from the VM 106 to an external storage or network device (e.g, network switch 116) or from the external storage or network device back to the VM 106 over the PCIe bus.

In the example of FIG. 1, the HBA 104 is configured to serve as the interface for the network packet traffic to and from the VMs 106 running on the host 102 with an external network device, such as a physical network switch 116, which then transmit the network traffic over a network (not shown) following certain communication protocols such as TCP/IP protocol. Here, the network can be but is not limited to, internet, intranet, wide area network (WAN), local area network (LAN), wireless network, WiFi, mobile communication network, or any other network type. The physical connections of the network and the communication protocols are well known to those of skill in the art.

In some embodiments, the HBA 104 includes a plurality physical ports 114 designated as, e.g., Port 0, Port 1, etc, each associated with a plurality of corresponding PF and VF functions provided by the HBA 104 for communication with, for a non-limiting example, a Layer 2 physical network switch 116. In some embodiments, the physical ports 114 of the HBA 104 are XAUI ports in compliance with 10 Gigabit Media Independent Interface (XGMII) for 10 Gigabit Ethernet (10 GbE) and/or other types of ports supporting I/O speeds at one or more of 10 G, 25 G, 40 G 50 G, and 100 G per second. In some embodiments, each port 114 may include one or more message queues for packets to be transmitted to (Tx) and received from (Rx) the network switch 116, respectively.

In the example of FIG. 1, the HBA 104 is configured to create one or more link aggregation offload engines (bonding devices) 112 inside the HBA 104, wherein each link aggregation offload engine 112 is mapped to include one or more of the physical ports 114 and configured to offload aggregation of a plurality of links established with the VMs running on the host via the VFs associated with the physical ports 114. In some embodiment, the HBA 104 is configured to create one unified interface for all of the physical ports 114 bonded in the link aggregation offload engine 112 instead of one interface per physical port 114 for the host 102 to access the remote network and or storage services.

In the non-limiting example as shown in FIG. 1, both physical Port 0 and Port 1 as well as their associated PFs, PF_0 and PF_1, and VFs, VF_0s and VF_1s are bonded together by the link aggregation offload engine 112. When VM_1 running on the host 102 intends to send a network data packet through its assigned VF, VF_1 of the HBA 104, the link aggregation offload engine 112 is configured to direct the network data packet out of the HBA 104 via either physical Port 0 or Port 1 based on the link aggregation or bonding algorithm/method adopted by the link aggregation offload engine 112 and/or the network condition out of the HBA 104.

Specifically, when VM_1 initiates network traffic through the HBA 104, it first establishes a first link with the link aggregation offload engine 112 of the HBA 114 through its assigned VF_1, instead of trying to establish a direct link to one of the physical Port 0 or Port 1 of the HBA 104. Upon receiving a network data packet from the VM_1 via VF_1, the link aggregation offload engine 112 is configured to send the received network data packet to one of the one of the physical Port 0 or Port 1 based on its link aggregation or bonding method. Here, the link aggregation offload engine 112 may choose one of its physical ports 114, e.g., Port 1, to establish a second link to transmit the network packet out of the HBA 104 via a link aggregation algorithm, which takes into factors that include but are not limited to, one or more of the current network traffic load or availability of the physical ports 114, the data transmission rates of the physical ports 114, and past data packet transmission records and/or preferences of VM_1. If the second link through Port 1 fails due to, for a non-limiting example, failed connection with the physical network switch 116, the link aggregation offload engine 112 is configured to dynamically select Port 0 of the HBA and establish an alternative third link through Port 0 for the transmission of the packet out of the HBA 104 instead. The entire process of establishing a successful link out of the HBA 104 is managed by the link aggregation offload engine 112 in real time on per data packet basis based on its link aggregation algorithm and is transparent to VM_1. In fact, the first link between VM_1 and the link aggregation offload engine 112 remains intact during the process and no new VF of the HBA 104 is needed for a new link with VM_1, which saves VFs of the HBA 104 for other VMs and the computing resources of the host 102 required for link aggregation.

In some embodiments, when there are multiple physical ports 114 on the HBA 104, multiple link aggregation offload engines 112 can be created inside the HBA 104, wherein one of the link aggregation offload engines 112 may be mapped to include one physical port 114. Such configuration enables moving one or more physical ports 114 and their associated PFs and VFs from one link aggregation offload engines 112 to another at runtime based on the current load of network traffic and/or link aggregation from the VMs 106 to their assigned VFs in the HBA 104. For example, if one of the physical ports 114 that belongs to a first link aggregation offload engine 112 is overloaded by links aggregated through the first link aggregation offload engines 112, the port may be moved to another/second link aggregation offload engine 112 that is less loaded than the first so the links and network traffic through the link aggregation offload engines 112 can be more balanced. In the non-limiting example of a three-port HBA 104 as shown in FIG. 1, Port 0 and Port 1 are mapped to a first link aggregation offload engine 112 while Port 2 is mapped to another/second link aggregation offload engine 112. During operation, one of Port 0 and Port 1 is dynamically moved to the second link aggregation offload engine 112 bonding that originally has Port 2 only in order to balance the link aggregation load among the two link aggregation offload engines 112.

Figure 2:
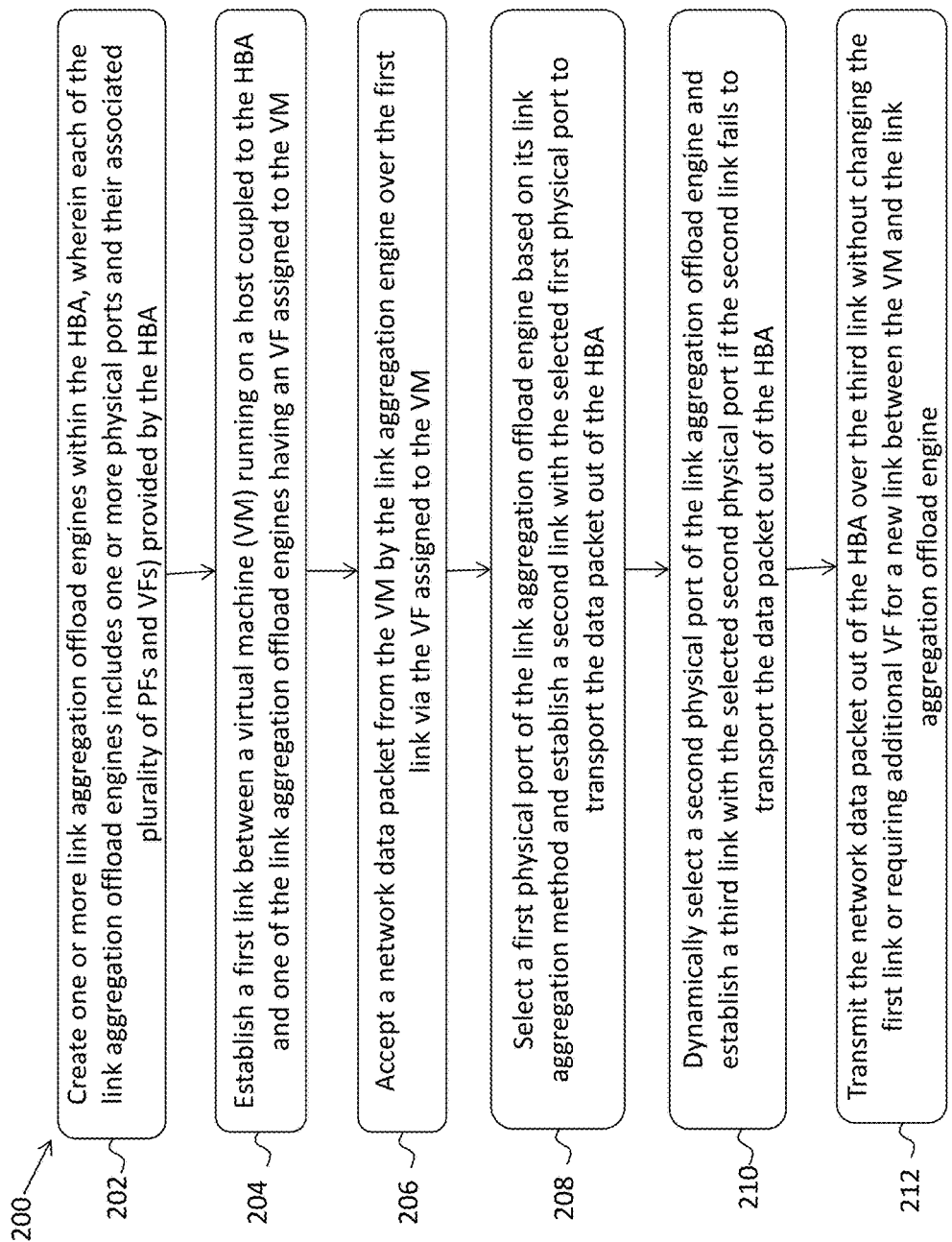
FIG. 2 depicts a flowchart of an example of a process to support offloading of link aggregation from a host to a HBA in SRIOV mode in accordance with some embodiments.

FIG. 2 depicts a flowchart of an example of a process to support offloading of link aggregation to a HBA in SRIOV mode. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where one or more link aggregation offload engines are created within a HBA, wherein each of the link aggregation offload engines includes one or more physical ports and their associated plurality of PFs and VFs provided by the HBA. The flowchart 200 continues to block 204, where a first link is established between a VM running on a host coupled to the HBA and one of the link aggregation offload engines having an VF assigned to the VM. The flowchart 200 continues to block 206, where a network data packet is accepted from the VM by the link aggregation offload engine over the first link via the VF assigned to the VM. The flowchart 200 continues to block 208, where a first physical port of the link aggregation offload engine is selected based on its link aggregation method and a second link is established with the selected first physical port to transport the network data packet out of the HBA. The flowchart 200 continues to block 210, where a second physical port of the link aggregation offload engine is selected and a third link is established with the selected second physical port if the second link fails to transport the data packet out of the HBA. The flowchart 200 ends at block 212, where the network data packet is transmitted out of the HBA over the third link without changing the first link or requiring additional VF for a new link between the VM and the link aggregation offload engine.

Figure 3:
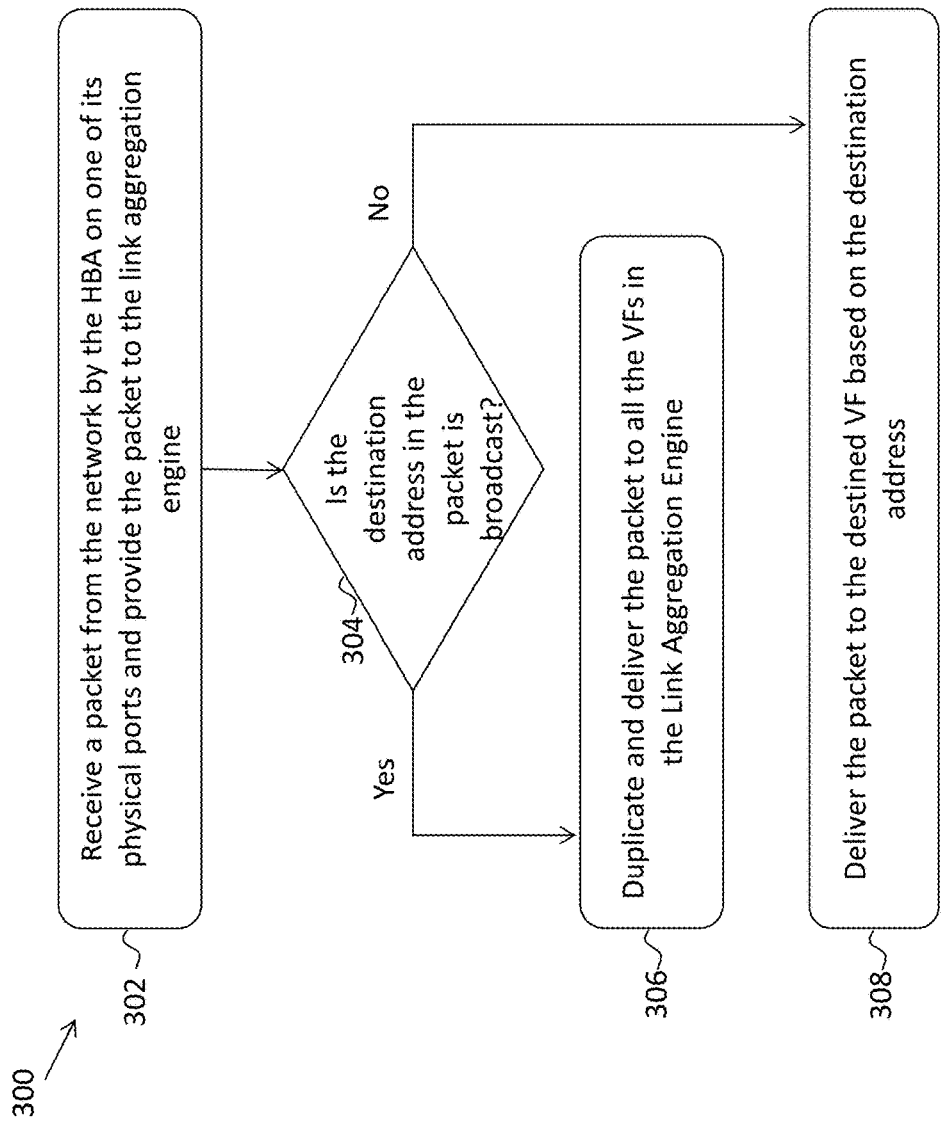
FIG. 3 depicts a flowchart of an example of a process to support transmitting of incoming packets from the HBA to the VMs on the host under the link aggregation offloading approach in accordance with some embodiments.

FIG. 3 depicts a flowchart of an example of a process to support transmitting of incoming packets from the HBA to the VMs on the host under the link aggregation offloading approach discussed above. In the example of FIG. 3, the flowchart 300 starts at block 302, where a packet from the network is received by the HBA on one of its physical ports and provided to the link aggregation engine, via, for a non-limiting example, the third link. The flowchart 300 continues to block 304, where a destination address in the packet is checked by the link aggregation engine to determine if it is a broadcast address. Here, the destination address can be a MAC address of one of the I/O components of the host. The flowchart 300 continues to block 306, where the packet is duplicated and delivered by the link aggregation engine to all of its VFs if the destination address is a broadcast address. Otherwise, the flowchart 300 continues to block 308, where the packet is delivered by the link aggregation engine only to a destined VF (and further to one of the VMs running on the host) based on the destination address.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support offloading of link aggregation from a host to a host bus adapter (HBA) in single root I/O virtualization (SRIOV) mode, comprising:
    said HBA, which in operation, is configured to:
        create one or more link aggregation offload engines within the HBA, wherein each of the link aggregation offload engines includes one or more physical ports and their associated plurality of physical functions (PFs) and virtual functions (VFs) provided by the HBA;
        establish a first link between a virtual machine (VM) running on the host coupled to the HBA and one of the link aggregation offload engines having an VF assigned to the VM;
    said link aggregation offload engine of the HBA configured to
        accept a network data packet from the VM over the first link via the VF assigned to the VM;
        select a first physical port of the link aggregation offload engine based on its link aggregation method and establish a second link with the selected first physical port to transport the data packet out of the HBA;
        dynamically select a second physical port of the link aggregation offload engine and establish a third link with the selected second physical port if the second link fails to transport the data packet out of the HBA;
        transmit the network data packet out of the HBA over the third link without changing the first link or requiring additional VF for a new link between the VM and the link aggregation offload engine.

2. The system of claim 1, wherein:
the HBA is a network interface card (NIC), which is configured to support flexible packet processing at various I/O rates.

3. The system of claim 2, wherein:
one or more of the physical ports of the HBA support I/O rates at one or more of 10 G, 25 G, 40 G 50 G, and 100 Gigabit per second.

4. The system of claim 1, wherein:
the host and the HBA are configured to communicate with each other over a high-speed Peripheral Component Interconnect Express (PCIe) bus coupled between the host and the HBA.

5. The system of claim 1, wherein:
only one VF of the HBA per VM is required for communication between the VM and the link aggregation engine at all times.

6. The system of claim 1, wherein:
the link aggregation engine is configured to offload aggregation of a plurality of links established with a plurality of VMs running on the host via the VFs associated with the physical ports.

7. The system of claim 6, wherein:
the HBA is configured to create one unified interface for all of the physical ports bonded in the link aggregation offload engine on the host to access remote network and or storage services.

8. The system of claim 1, wherein:
the link aggregation engine is configured to select one of the physical ports based on one or more of current network traffic load or availability of the physical ports, data transmission rates of the physical ports, and past data packet transmission records and/or preferences of the VM.

9. The system of claim 1, wherein:
the link aggregation engine is configured to manage selection of the physical ports and transmission of the network data packet out of the HBA in real time on per data packet basis and transparent to the VM.

10. The system of claim 1, wherein:
the HBA is configured to
    create multiple link aggregation offload engines inside the HBA each having one or more physical ports;
    dynamically move one or more physical ports and their associated PFs and VFs from one link aggregation offload engines to another at runtime based on current load of network traffic and/or link aggregation from one or more VMs running on the host.

11. The system of claim 10, wherein:
the HBA is configured to re-assign one or more first links established between the VMs and the link aggregation offload engines accordingly when the physical ports and their PFs and VFs are moved from one link aggregation offload engine to another.

12. The system of claim 1, wherein:
the link aggregation engine is configured to
    receive a packet from the network on one of the physical ports of the HBA;
    check a destination address in the packet to determine if it is a broadcast address;
    duplicate and deliver the packet all of its VFs if the destination address is a broadcast address;
    deliver the packet only to a destined VF based on the destination address if the destination address is not a broadcast address.

13. A method to support offloading of link aggregation to a host bus adapter (HBA) in single root I/O virtualization (SRIOV) mode, comprising:
    creating one or more link aggregation offload engines within the HBA, wherein each of the link aggregation offload engines includes one or more physical ports and their associated plurality of physical functions (PFs) and virtual functions (VFs) provided by the HBA;
    establishing a first link between a virtual machine (VM) running on a host coupled to the HBA and one of the link aggregation offload engines having an VF assigned to the VM;
    accepting a network data packet from the VM by the link aggregation engine over the first link via the VF assigned to the VM;
    selecting a first physical port of the link aggregation offload engine based on its link aggregation method and establish a second link with the selected first physical port to transport the data packet out of the HBA;
    dynamically selecting a second physical port of the link aggregation offload engine and establish a third link with the selected second physical port if the second link fails to transport the data packet out of the HBA;
    transmitting the network data packet out of the HBA over the third link without changing the first link or requiring additional VF for a new link between the VM and the link aggregation offload engine.

14. The method of claim 13, further comprising:
enabling the host and the HBA to communicate with each other over a high-speed Peripheral Component Interconnect Express (PCIe) bus coupled between the host and the HBA.

15. The method of claim 13, further comprising:
requiring only one VF of the HBA per VM for communication between the VM and the link aggregation engine at all times.

16. The method of claim 13, further comprising:
offloading aggregation of a plurality of links established with a plurality of VMs running on the host via the VFs associated with the physical ports.

17. The method of claim 16, further comprising:
creating one unified interface for all of the physical ports bonded in the link aggregation offload engine for the host to access remote network and or storage services.

18. The method of claim 13, further comprising:
selecting one of the physical ports based on one or more of current network traffic load or availability of the physical ports, data transmission rates of the physical ports, and past data packet transmission records and/or preferences of the VM.

19. The method of claim 13, further comprising:
managing selection of the physical ports and transmission of the network data packet out of the HBA in real time on per data packet basis and transparent to the VM.

20. The method of claim 13, further comprising:
creating multiple link aggregation offload engines inside the HBA each having one or more physical ports;
dynamically moving one or more physical ports and their associated PFs and VFs from one link aggregation offload engines to another at runtime based on current load of network traffic and/or link aggregation from one or more VMs running on the host.

21. The method of claim 20, further comprising:
re-assigning one or more first links established between the VMs and the link aggregation offload engines accordingly when the physical ports and their PFs and VFs are moved from one link aggregation offload engine to another.

22. The method of claim 13, further comprising:
receiving a packet from the network on one of the physical ports of the HBA;
checking a destination address in the packet to determine if it is a broadcast address;
duplicating and delivering the packet all of the VFs of the link aggregation offload engine if the destination address is a broadcast address;
delivering the packet only to a destined VF based on the destination address if the destination address is not a broadcast address.

* * * * *